United States Patent [19]

Bedell

[11] Patent Number: 4,921,683
[45] Date of Patent: May 1, 1990

[54] NITRIC OXIDE ABATEMENT WITH POLYMERIC COBALT(III) CHELATES

[75] Inventor: Stephen A. Bedell, Lake Jackson, Tex.

[73] Assignee: The Dow Chemical Company, Midland, Mich.

[21] Appl. No.: 368,613

[22] Filed: Jun. 20, 1989

[51] Int. Cl.$^5$ .................. C01B 21/00; C02F 1/68; C02F 1/72
[52] U.S. Cl. .................. 423/235; 204/112; 204/149; 210/758; 210/763
[58] Field of Search .......... 423/235, 385, 395; 210/758, 763; 204/112, 149

[56] References Cited

U.S. PATENT DOCUMENTS

| | | | |
|---|---|---|---|
| 3,564,818 | 2/1971 | Lasky | 55/73 |
| 3,646,594 | 2/1972 | Lasky | 55/59 |
| 3,724,469 | 4/1973 | Reynolds et al. | 131/266 |
| 4,026,831 | 5/1977 | Moriya et al. | 260/2.1 |
| 4,081,509 | 3/1978 | Hishinuma et al. | 423/235 |
| 4,085,060 | 4/1978 | Vassileff | 252/180 |
| 4,087,372 | 5/1978 | Saitoh et al. | 252/184 |
| 4,600,483 | 7/1986 | Hubred et al. | 204/112 |
| 4,708,854 | 11/1987 | Grinstead | 423/235 |
| 4,778,664 | 10/1988 | Grinstead | 423/235 |

FOREIGN PATENT DOCUMENTS

| | | | |
|---|---|---|---|
| 2613417 | 10/1976 | Fed. Rep. of Germany | 423/235 |
| 3217299 | 2/1983 | Fed. Rep. of Germany | |
| 22773 | 7/1973 | Japan | 423/235 |
| 53-016384 | 2/1978 | Japan | |
| 53-094293 | 8/1978 | Japan | |

OTHER PUBLICATIONS

A. Earnshaw et al, *Transition Metal-Schiff's Base Complexes*, Part.II. *The Reaction of Nitric Oxide with Some Oxygen-Carring Cobalt Compounds* (1965), pp. 4718–4723.
Bedell et al, *I & EC Research*, vol. 27, p. 2092 (1988).
Nishide et al, *Makromol. Chem.*, 186, 1513–1518 (1985).
Pshezhetskii et al, CA 94:122233q (1981).
Butina et al, CA 100:144551m (1984).
Geckeler et al, CA 93:205294r (1980).
Fuji et al, CA 84:126266u (1975).
Tanabe et al, CA 84:126267v (1975).
Ono et al, CA 91:162538m (1979).
Inoue et al, CA 88:176546p (1978).

*Primary Examiner*—John Doll
*Assistant Examiner*—Wayne A. Langel
*Attorney, Agent, or Firm*—D. N. Lundeen

[57] ABSTRACT

An NO abatement process wherein an NO-containing fluid is contacted with a polymeric cobalt(II) dioxygen diamine complex. The aqueous solution is recovered, purified by membrane separation to remove low molecular weight reaction products, optionally electrolytically regenerated, and recycled for the NO-containing gas contact. The cobalt(II) is complexed with an amine-containing polymer such as polyethyleneimine free of acidic, e.g. carboxylate, chelating groups.

19 Claims, 1 Drawing Sheet

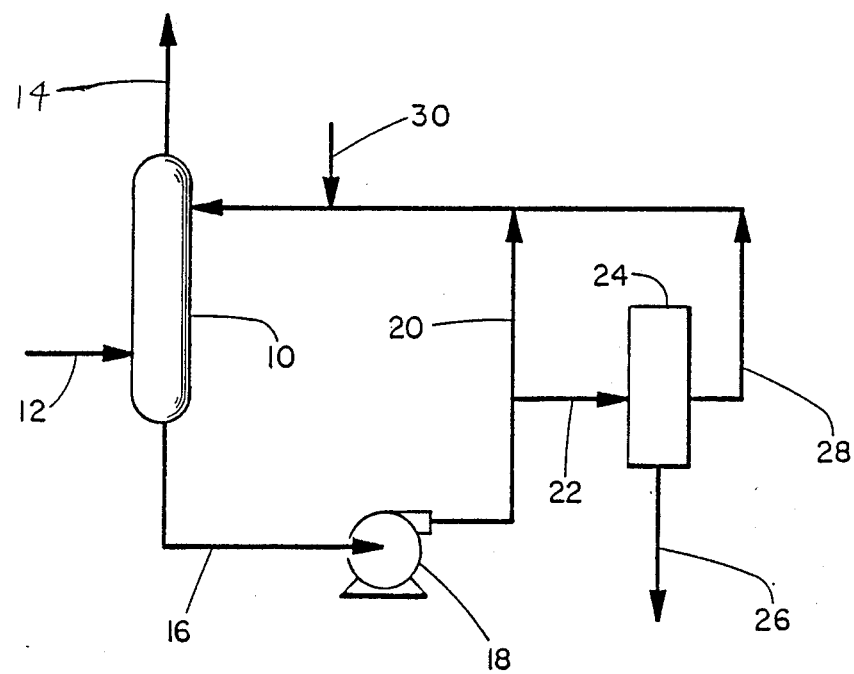

NITRIC OXIDE ABATEMENT WITH POLYMERIC COBALT(III) CHELATES

FIELD OF THE INVENTION

This invention relates to a process wherein a fluid stream containing nitric oxide (NO) is treated with a water soluble polymeric chelate of cobalt to oxidize the NO to water soluble nitrogen compounds. The water soluble nitrogen reaction products are separated from the polymeric chelate. The cobalt chelate is then recycled and reused.

RELEVANT ART

U.S. Pat. No. 4,708,854 discloses a process for the removal of NO and sulfur dioxide ($SO_2$) from a fluid stream using a water soluble polymeric chelate of a polyvalent metal. The polymeric chelate has pendant chelating groups, e.g. acidic groups, for chelating the polyvalent metal, e.g. iron. The chelate adsorbs the NO which is subsequently reacted with bisulfite to form imidodisulfonates. $SO_2$ is a component of the fluid stream for a source of the bisulfite which is formed by reaction of the $SO_2$ with water.

A study of polymeric iron chelates in NO removal from flue gas streams is found in Bedell et al, *I & EC Research*, vol, 27, p. 2092 (1988).

Nishide et al, *Makromol. Chem.* 186, 1513–1518 (1985) discloses the reversible oxygen binding to cobalt-(II) complexes of linear and branched polyethyleneimines in aqueous solution at room temperature.

Pshezhetskii et al, CA 94:122233q (1981) discloses conformational changes of complexes of cobalt(II) with polyethyleneimine in comparison with that by low molecular weight ligands.

Butina et al, CA 100:144551m (1984) discloses the removal of phenols from wastewaters by catalytic oxidation in the presence of oxygen and complexes of transition metals with polyethyleneimine at a pH of 7–10.

Bayer, CA 85:130139t (1976) discloses the removal of metallic ions from wastewaters by forming complexes thereof with high-molecular-weight polyethyleneimines and recovery by electrodialysis.

Geckeler et al, CA 93:205294r (1980) discloses the preparation of water soluble polymeric chelating agents such as poly(ethyleneimine-N-(N'-methylthiourea)) and their chelating ability and selectivity towards various transition metals such as cobalt.

U.S. Pat. No. 4,081,509 to Hishinuma et al discloses the removal of nitrogen oxide with cobalt complexes containing ligands such as ammine, ethanolamine and histidine and other imidazole derivatives.

Other U.S. Patents constituting relevant background information to the present invention include U.S. Pat. No. 4,087,372 to Saitoh et al; U.S. Pat. No. 4,085,060 to Vassileff; U.S. Pat. No. 4,026,831 to Moriya et al; U.S. Pat. No. 3,724,469 to Reynolds et al; U.S. Pat. No. 3,646,594 to Lasky et al; and U.S. Pat. No. 3,564,818 to Lasky et al. Other relevant references include German Document No. 3,217,-299; Japanese Kokai 53,016,384 and 53,094,293; and publications Fujii et al, CA 84:126266u (1975); Tanabe et al, CA 84:126267v (1975); Ono et al, CA 91:162538m (1979); and Inoue et al, CA 88:176546p (1978).

SUMMARY OF THE INVENTION

The present invention provides a method for abating NO in a fluid stream. The method includes the steps of (a) contacting a fluid stream containing nitric oxide with an aqueous solution of a polymeric cobalt(II) diamine dioxygen complex; (b) recovering aqueous solution resulting from the contact with the fluid stream in step (a); (c) purifying the recovered aqueous solution to remove low molecular weight reaction products; and (d) recycling the purified solution from step (c) for reuse in the aqueous solution in step (a). The polymeric cobalt(II) diamine dioxygen complex is obtained by complexing a cobalt(II) salt with a water soluble, high molecular weight, basic polymer containing amine chelating groups, wherein the molar ratio of the amine groups to cobalt(II) is from 3 to 6, and oxygenating the resulting polymeric cobalt(II) diamine complex. Optionally, the cobalt complex may be electrolytically regenerated prior to recycling to reduce any cobalt(III) to cobalt(II).

The process directly oxidizes NO to soluble nitrogen compounds. It is not a requirement of the present process that sulfites be present in the contacting solution. Therefore, the method may be advantageously used in the abatement of NO from $SO_2$-free flue gases.

BRIEF DESCRIPTION OF THE DRAWING

The FIGURE of the drawing illustrates a process in which an aqueous solution of an organic polymeric chelate of cobalt(II) according to the invention is applied to the removal of NO contained in a fluid stream, such as from a gas turbine, and may contain up to 1% by volume of NO, preferably between about 200 and 500 ppm. $SO_2$ may also be present, and this will normally be removed along with the NO, although it is not a requirement that $SO_2$ be present and the process will work equally well in the presence or absence of $SO_2$. The fluid stream to be treated may also contain oxygen, and preferably contains at least a stoichiometric equivalent of oxygen to NO, and especially from 5 to 30 percent oxygen by volume. The gas stream is fed to column 10 via line 12 from a turbine or other flue gas source (not shown), preferably quenched or otherwise cooled to about 50°–60° C. or less. The pressure of the feed gas is generally not critical, but is usually about atmospheric or superatmospheric.

In the column 10, the gas from line 12 is contacted with an aqueous solution of the polymeric cobalt(II) diamine dioxygen complex. Any manner of suitable contact between the cobalt complex and the NO-containing gas is contemplated, although a countercurrent configuration of the gas rising through a column of the aqueous chelate solution is preferred. The temperature of the aqueous admixture is not particularly critical, but temperature extremes which result in freezing or boiling of the aqueous solution are certainly to be avoided. The temperature is preferably between about 25° C. and 60° C. since solubility problems and polymer degradation are minimized in this temperature range. The optimum pH of this aqueous admixture depends on the amine polymer protonation characteristics, concentration and other conditions, but a pH range of between about 6 and 11 is usually suitable. The contact time between the aqueous admixture and the gas should be sufficient to adsorb substantially all of the NO and to react or oxidize the NO to form soluble nitrogen reaction products. The contact time may be as little as 1 second, depending on the NO content of the gas stream, the concentration of cobalt complex, and other conditions of contact. There is generally no advantage in contact times above about 2 minutes. Preferred contact times are between about 2 seconds and 1 minute. The purified gas stream leaves the column 10 via line 14 and generally meets standard environmental emission standards for NO and $SO_2$.

The aqueous admixture containing the cobalt complexes and soluble nitrogen reaction products is withdrawn from the bottom of column 10 through line 16 and pumped by pump 18 through recycle line 20. At least a portion of the aqueous solution is fed through line 22 into separator 24 which employs separation means for separating low molecular weight materials from the high molecular weight polymeric cobalt complex, e.g. a membrane separator such as by ultrafiltration, nanofiltration or dialysis. Ultrafiltration retaining compounds having a molecular weight of 1000 and above is preferred, and especially above 500. The low molecular weight ultrafiltrate is withdrawn through line 26 and disposed of in an environmentally acceptable manner. The concentrated polymeric chelate is recycled to the column 10 via line 28. As needed, water makeup, polymeric chelate makeup, cobalt makeup, and pH adjustment are effected in the process through line 30.

DETAILED DESCRIPTION OF THE INVENTION

The fluid streams which may be treated according to the present invention include any gas, liquid, or gas-liquid streams which contain NO, such as, for example, stack gases from a power plant, combustion gases from the burning of natural gas, petroleum, oil shell, coal, and the like. The process is particularly well suited to the treatment of $SO_2$-free streams such as gas turbine flue gases.

The polymeric cobalt chelating complexes employed in the present invention for the abatement of NO may be prepared by complexing cobalt(II) with a polymeric chelating agent. Any cobalt(II) salt may be employed for this purpose, preferably water soluble salts, such as, for example, nitrate, sulfate, perchlorate, bromide, chlorate, chloride, iodide, orthophosphate, and like salts.

The polymeric chelate has a sufficiently high molecular weight to facilitate separation from low molecular weight reaction products resulting from the oxidation of NO by the chelated cobalt(II), preferably between about 500 and 1,000,000 and more preferably between about 1,000 and 500,000. The polymeric chelate contains amine groups capable of chelating the cobalt(II). The polymeric chelate is preferably free of acidic chelating groups such as hydroxyl, carboxyl, sulfonyl, and the like which, in the presence of oxygen, can accelerate the oxidation of cobalt(II) to cobalt(III). Preferably, the polymeric chelate is essentially free of acid groups equal to or in excess of a molar equivalent to the amine groups. In a particularly preferred embodiment, the polymeric chelate is essentially free of acidic chelating groups.

A particularly preferred polymeric chelate is polyethyleneimine of the formula $(-CH_2-CH_2-NH-)_n$ wherein n is a sufficiently high integer to obtain the desired molecular weight. In contrast to Fe(II) chelating systems, cobalt(II) is readily complexed by the secondary amine groups in polyethyleneimines and it is not necessary or desirable to introduce acidic N-substituents into the polyethyleneimine backbone. Also contemplated as suitable are other polymers containing amine groups capable of chelating cobalt(II), preferably primary and/or secondary amine groups, such as, for example, water soluble proteins and peptides wherein the number of acidic groups, e.g. carboxylate, is less than the number of amine groups so that the peptide or protein has basicity.

The complex is prepared by mixing the cobalt(II) salt with the polymeric chelate, typically in an aqueous medium, preferably by adding a solution of the cobalt-(II) salt to a solution of the polyethyleneimine. The ratio of amine groups in the polyethyleneimine to the cobalt-(II) is preferably in the range between about 3 and 6, and more preferably between about 4 and 5. Below this range, there may not be sufficient polymeric chelate to complex all of the cobalt(II), and no advantage is gained by exceeding this range. The complex of cobalt(II) at this stage is a diamine complex. A dioxygen adduct is formed by oxygenating the cobalt diamine complex, such as, for example, by contacting an aqueous solution of the polymeric diamine cobalt complex with air or another oxygen-containing gas.

The polymeric cobalt complex is employed in the aqueous solution with which the NO-containing gas stream to be abated is contacted at a concentration of between about 0.001 and 1 molar, preferably between about 0.005 and 0.05 molar. The cobalt complex serves to bind oxygen which is desirably present in the gas stream being treated, and also appears to bind NO which is usually necessary to obtain oxidation thereof since NO is not typically adsorbed into an aqueous solution in the absence of NO binding. In contrast to Fe(II) systems, however, the NO is surprisingly oxidized by the cobalt complex into soluble nitrogen reaction products, e.g. nitrates and nitrites, and it is not necessary to have sulfite or bisulfite present in the contacting solution in order to abate NO via an imidodisulfonate intermediate.

The utility of the invention is illustrated by way of the following examples which show NO abatement by a filterable polymeric cobalt complex.

EXAMPLES 1-4 AND COMPARATIVE EXAMPLES A AND B

A cobalt dioxygen complex was prepared by dissolving 15.8 g of PEI-600 polyethyleneimine (Dow Chemical) in 200 ml of water. A solution of 5.95 g of Co $Cl_2.6H_2O$ in 100 ml water was added to the PEI-600, and the mixture was diluted with water to 500 ml and pH adjusted to 8.5 with NaOH. Air was sparged through the solution for at least 30 minutes and formation of the dioxygen complex was evidenced by a characteristic brown color of the solution. Aliquots of 50 ml of this solution were then diluted to 500 ml (5 mM $Co^{2+}$) saturated with air for one-half hour, and the pH adjusted as desired. A gas stream containing 220 ppm NO, 5.2 volume percent oxygen, 9.2 volume percent $CO_2$ and the balance nitrogen, was sparged into the solution at 25° C. at varying rates through a 2 cm by 1 cm diameter cylindrical fine glass frit positioned with its bottom end 9 cm below the solution surface. A magnetic stirrer was employed beneath the frit. Steady state NO abatement was measured after 30–40 minutes of continuous sparging. The results are summarized in Table I with a comparison to NO abatement using deionized water in place of the cobalt complex solution (Comparative Examples A and B).

TABLE I

| EXAMPLE | pH | TOTAL GAS FLOW RATE (ml/min) | NO ABATEMENT (% at steady state) |
|---|---|---|---|
| 1 | 6.0 | 1500 | 17 |
| 2 | 6.0 | 500 | 33 |
| 3 | 8.6 | 500 | 35 |
| 4 | 11.0 | 500 | 35 |
| A[1] | 4 | 1500 | 2 |
| B[1] | 12 | 1500 | 0 |

Note for Table I:
[1] Examples A and B prepared using deionized water in place of cobalt complex solution for the purpose of comparison.

The foregoing data illustrate the ability of the polymeric cobalt complex to abate NO and the effects of pH and contact time thereon.

The foregoing description is illustrative and exemplary of the invention, and many variations and modifications will occur to those skilled in the art in view thereof. It is intended that all such modifications and variations within the scope or spirit of the appended claims be enhanced thereby.

What is claimed is:

1. A method for abating nitric oxide in a fluid stream, comprising the steps of:
   (A) contacting a fluid stream containing nitric oxide with an aqueous solution of a polymeric cobalt(II) diamine dioxygen complex, wherein said complex is obtained by (a) complexing (i) a cobalt(II) salt with (ii) a water soluble, basic polymer comprising polyethyleneimine containing secondary amine groups, wherein the molar ratio of said amine groups to cobalt(II) is from 3 to 6, and (b) oxygenating the resulting polymeric cobalt(II) diamine complex;
   (B) recovering aqueous solution resulting from said contact with said fluid stream in step (A);
   (C) purifying said recovered aqueous solution to remove low molecular weight reaction products; and
   (D) recycling the purified solution from step (C) for reuse in the aqueous solution of step (A).

2. The method of claim 1, wherein said fluid stream contains oxygen.

3. The method of claim 1, wherein said fluid stream is essentially free of sulfur oxides.

4. The method of claim 1, wherein said water soluble polymer has a molecular weight between about 500 and 1,000,000.

5. The method of claim 1, wherein said polymer is essentially free of acidic chelating groups in excess of a 1:1 molar ratio of said acidic groups to said amine groups.

6. The method of claim 1, wherein said purification is by ultrafiltration or dialysis.

7. The method of claim 1, wherein said purification removes at least a portion of said reaction products with a molecular weight less than 1000.

8. The method of claim 1, further comprising the step of electrolytically regenerating said recovered aqueous solution.

9. A method for abating nitric oxide in a fluid stream, comprising the steps of:
   (A) contacting a fluid stream containing oxygen and nitric oxide in a contacting zone with an aqueous solution of a polymeric cobalt(II) diamine complex effective to produce a fluid stream of reduced nitrogen oxide content, wherein said complex is obtained by complexing (i) a cobalt(II) salt with (ii) polyethyleneimine having a molecular weight between about 500 and 1,000,000 and containing secondary amine groups, wherein the molar ratio of said amine groups to cobalt(II) is from 3 to 6, and wherein said polyethyleneimine is free of acidic chelating groups in an amount equal to or in excess of a 1:1 molar ratio of said acidic groups to said amine groups;
   (B) recovering the resulting aqueous phase produced in step (A);
   (C) concentrating the aqueous phase recovered in step (B) by membrane separation by effectively removing a portion of reaction products having a molecular weight below 1000; and
   (D) recycling the concentrated aqueous phase from step (C) to the contacting zone in step (A).

10. The method of claim 9, wherein said fluid stream is essentially free of sulfur oxides.

11. The method of claim 9, wherein said fluid stream comprises gas turbine flue gas.

12. The method of claim 9, wherein said polyethyleneimine has a molecular weight of between about 1,000 and 500,000.

13. The method of claim 9, wherein said membrane separation comprises ultrafiltration effective to remove reaction products with a molecular weight below 500.

14. The method of claim 9, wherein said molar ratio of secondary amine groups to cobalt(II) is between about 4 and 5.

15. The method of claim 9, further comprising the step of electrolytically regenerating cobalt(III) in the aqueous phase recovered in step (B) to cobalt(II).

16. The method of claim 9, wherein said contacting zone is maintained at a temperature between about 25° C. and 60° C.

17. The method of claim 9, wherein said polyethyleneimine is unsubstituted.

18. The method of claim 9, wherein said polyethyleneimine is essentially free of acidic substituents.

19. The method of claim 9, wherein the fluid stream is flue gas cooled to below about 60° C.

* * * * *